(No Model.)　　　　　　　　　　　　　　　　　7 Sheets—Sheet 3.
G. C. BLICKENSDERFER.
CONVEYING APPARATUS.

No. 305,566.　　　　　　　　　　　Patented Sept. 23, 1884.

Witnesses.
M. A. Edelin
W. R. Edelin

Inventor
Geo. C. Blickensderfer
Per Hallock & Hallock
Att's (No Model.) 7 Sheets—Sheet 5.

G. C. BLICKENSDERFER.
CONVEYING APPARATUS.

No. 305,566. Patented Sept. 23, 1884.

Witnesses.
M. A. Edelen
H. R. Edelen

Inventor.
Geo. C. Blickensderfer.
Per. Hallock & Hallock
Att's

N. PETERS. Photo-Lithographer. Washington, D. C.

(No Model.) 7 Sheets—Sheet 6.

G. C. BLICKENSDERFER.
CONVEYING APPARATUS.

No. 305,566. Patented Sept. 23, 1884.

Witnesses.
M. A. Edelen
W. R. Edelen

Inventor:
Geo. C. Blickensderfer.
Per Hallock & Hallock
Att's

UNITED STATES PATENT OFFICE.

GEORGE C. BLICKENSDERFER, OF ERIE, PENNSYLVANIA.

CONVEYING APPARATUS.

SPECIFICATION forming part of Letters Patent No. 305,566, dated September 23, 1884.

Application filed August 23, 1884. (No model.)

*To all whom it may concern:*

Be it known that I, GEORGE C. BLICKENSDERFER, a citizen of the United States, residing at Erie, in the county of Erie and State of Pennsylvania, have invented certain new and useful Improvements in Conveyer Apparatus; and I do hereby declare the following to be a full, clear, and exact description of the invention, such as will enable others skilled in the art to which it appertains to make and use the same.

This invention relates to that class of conveyer apparatus in which the tracks are suspended or elevated and the article to be carried hangs pendent from the track; and it consists in the following improvements: First, improvements in the construction and operation of the elevators, by which the cars are put upon the outgoing track at the stations and received from the incoming track and let down onto the counter at said stations; second, improvements in the construction of the cars; and, third, improvements in the means for erecting the tracks.

The device, as illustrated in the accompanying drawings, is designed especially for carrying packages and cash in stores; but by proper modifications, which would be purely mechanical, it may be adapted to the transportation of weightier articles.

The accompanying drawings illustrate my invention as follows:

Fig. 1½ is a continuation of Fig. 1, the letters $x\ x\ x\ x$ marking the points of connection of the tracks B and B'. The remaining twenty-three figures represent details of construction or of operation of parts, and will be best understood by referring to them in the proper connection in the following description.

A is the track which grades from the salesmen's stations to the central station or cashier's desk.

B is the track which grades from the central station to the salesmen's stations.

B' is the switch-track at a salesman's station.

C is the elevator-track, and consists of a plain smooth vertical bar upon which the elevator slides as it moves up and down.

D is the elevator-frame or body, which is provided with proper guide-flanges for embracing the track C. (I have shown flanged friction-sheaves $d\ d\ d\ d$, but simple guide-flanges will perhaps be sufficient.)

D' is the secondary part of the elevator-frame. It consists of a bar hung to the main frame D by links $d'\ d'$, so that it can swing toward or from the tracks.

$D^2$ is a section of track attached to the bar D', at right angles thereto.

Figure 9:
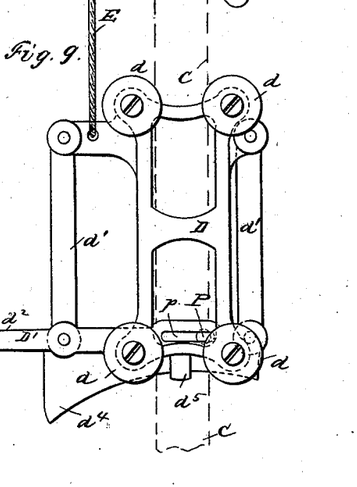
Figure 10:
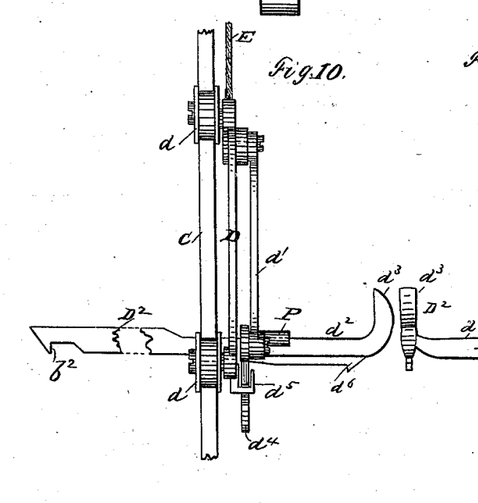
Figure 11:
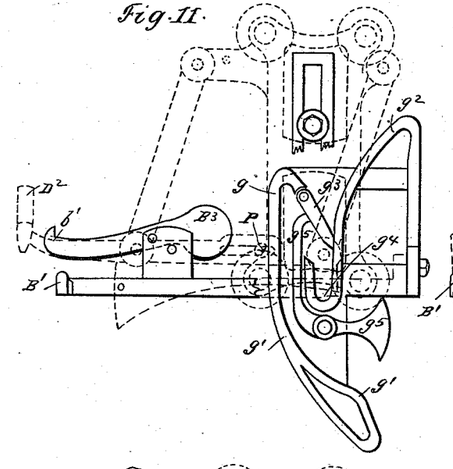
Figures 16, 17, 18:
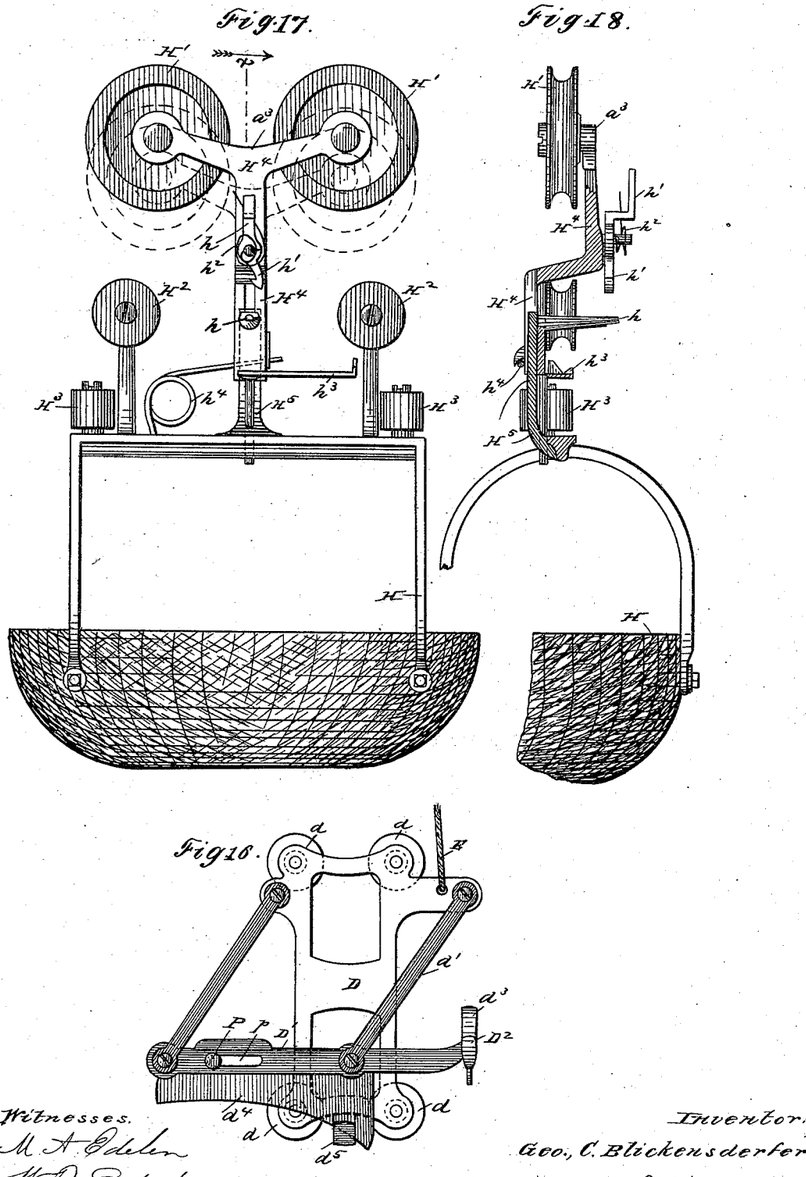

P is a pin extending from the swinging bar D', and serves as a handle by which the frame D' can be swung. The elevator is further illustrated in Figs. 9, 10, and 16, of which Fig. 9 is a side elevation, looking at the side seen in Fig. 1, the track C not being shown. Fig. 10 is an elevation view, looking directly at the back of the elevator, and Fig. 16 is an elevation of the side not seen in Fig. 1, and shows the swinging frame drawn back. The swinging bar D' is kept from moving laterally by a guide-lug, $d^5$, the under side of the bar being properly curved, as at $d^4$, to allow of the movement of the bar within the guide $d^5$. When the elevator is in position to receive a car, it will stand so that the bar $D^2$ will form a continuation of the switch-track B', as indicated by dotted lines in Fig. 1. The car, when received, will stand with its wheels $H^2\ H^2$ in the depression $d^2$ in the bar $D^2$. The turned-up end $d^3$ of the bar $D^2$ serves as a stop for the car.

Figures 4, 5, 6:
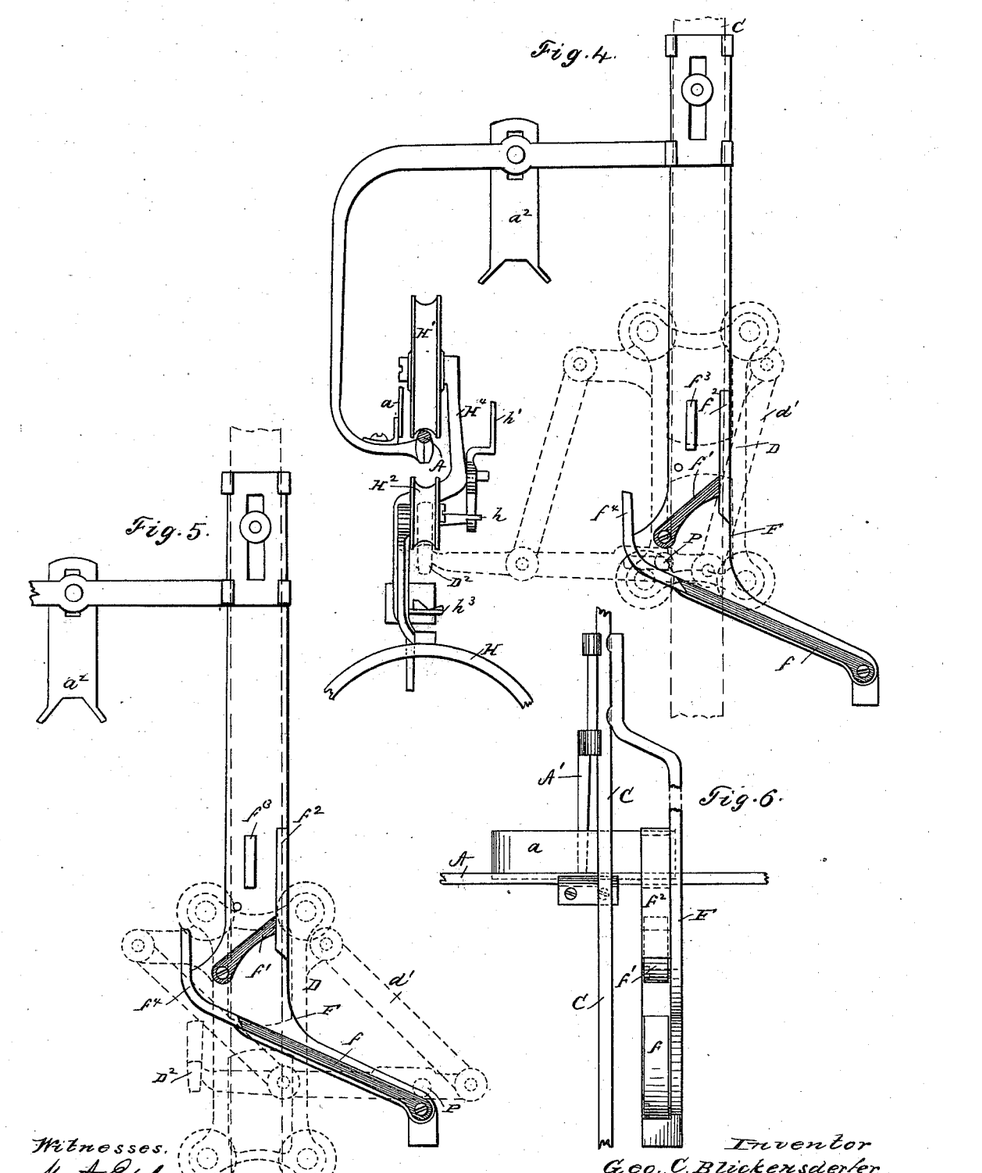

F and G are cams which act upon the pin P to swing the elevator-frame. The cam F swings the frame out, so as to bring the car-wheels H' H' over the track, allows it to drop squarely onto the track, and after the car is on the track it swings the frame back, so as to entirely clear the car. This cam is seen in perspective in Fig. 1, and in side elevation in Figs. 2, 3, 4, and 5, and in rear elevation in Fig. 6. Figs. 3, 4, and 5, show the elevator in dotted lines, and Figs. 3 and 4 show the running-gear of the car. These figures fully show the construction and operation of the cam F. It has three fixed guides, $f^2$, $f^3$, and $f^4$; and two movable guides, $f$ and $f'$, which are pivoted. Their changed positions are clearly shown in Figs. 2 and 3. The guide $f$, when down, as seen in Fig. 2, forms, with the flange $f^4$, a continuous guide, its point resting on the miter-face 1 at the lower end of the fixed flange $f^4$. When up, as seen in Fig. 3, its point stops against the face 2 at the lower end of the fixed flange $f^2$, and when in this position its lower surface forms a guide. When the elevator is pulled up to the full height, it is in the position shown in Fig. 3. Its pin P has lifted the pivoted guides $f$ and $f'$, as shown in that figure, and been guided by them in between the flanges $f^2$ and $f^3$. The guides $f$ and $f'$ of course drop back to their normal position as soon as the pin passes them. It will be seen in Fig. 3 that the car is so high that the wheels H' are considerably above the track A. The operator now lowers the elevator slowly. The pin P will strike on the top of the guide $f'$ and move down its incline and swing the bar $D^2$, on which the car is seated, out, so as to bring the wheels H' directly over the track A and seat them on it, as is shown in Fig. 4. As the elevator descends the pin P will run down the guides $f^4$ and $f$ and draw the bar $D^2$ of the elevator back to the frame D, so it will entirely clear the body of the car. This position is clearly seen in Fig. 5. As the elevator descends it is caught by the cam G in such a position that the bar $D^2$ will form a continuation of the track B', and thus it is in position to receive an incoming car. When in this position, the pin P rests in the hook $g^4$, as it is seen in Fig. 13.

Figure 1:
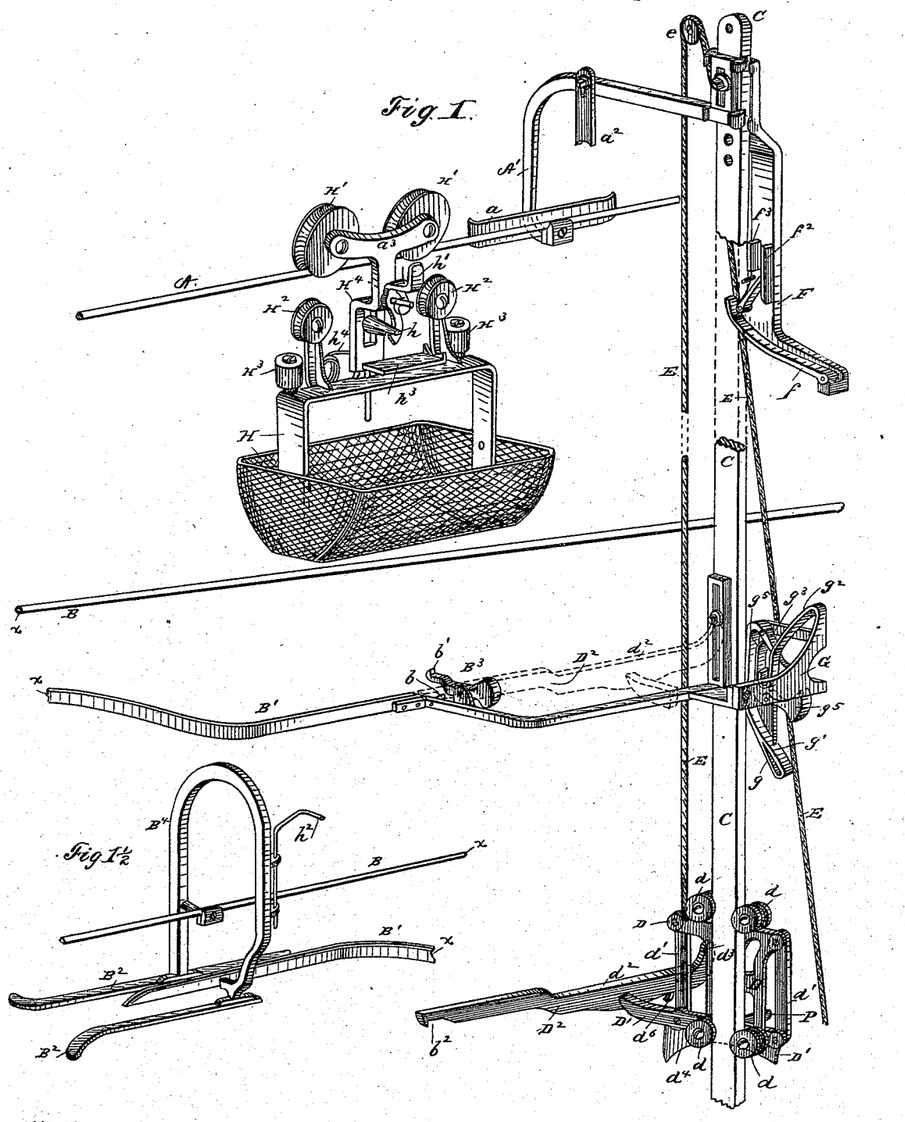
Figure 1 is a perspective view of the tracks, elevator, and car at a salesman's station.
Figures 2, 3:
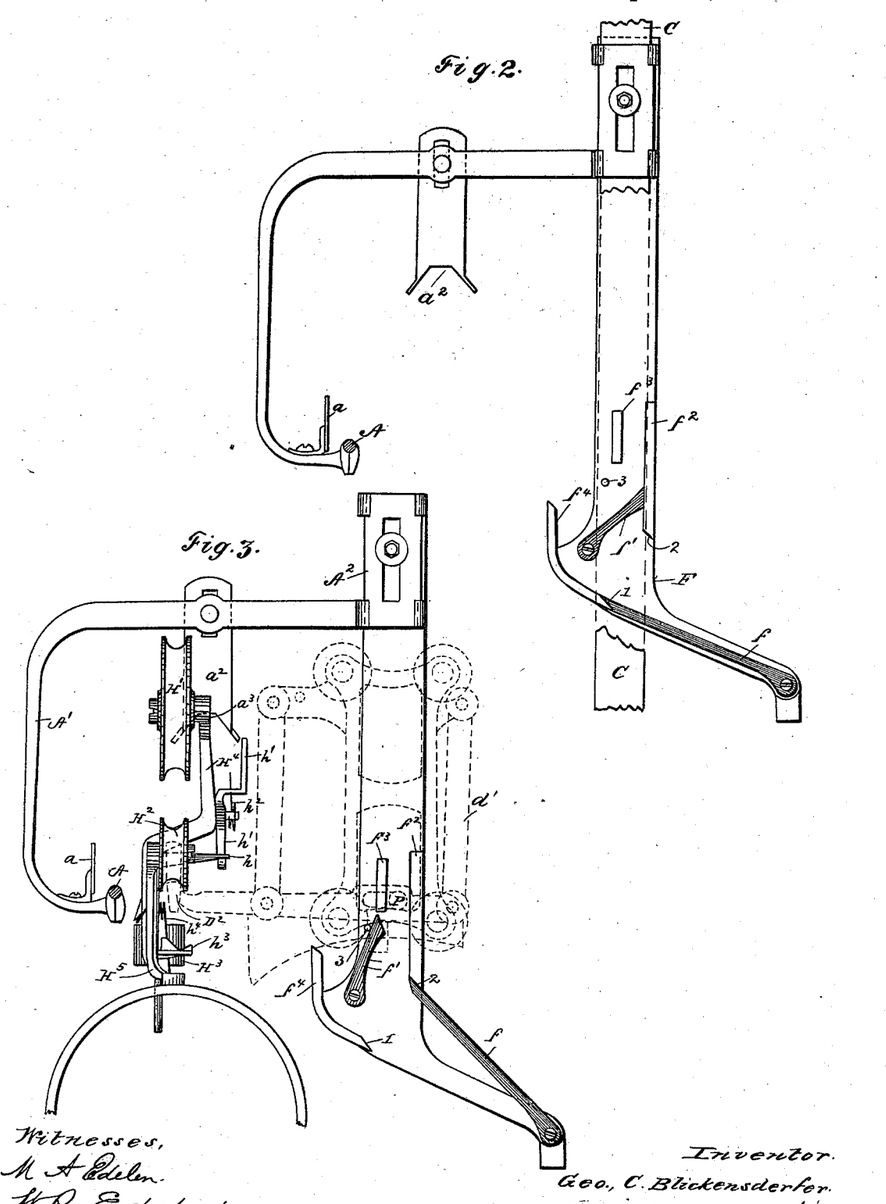
Figure 7:
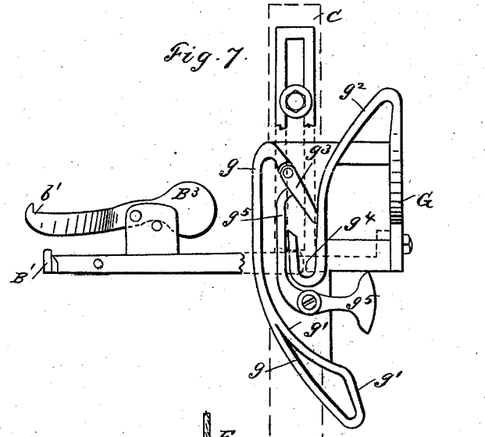
Figure 8:
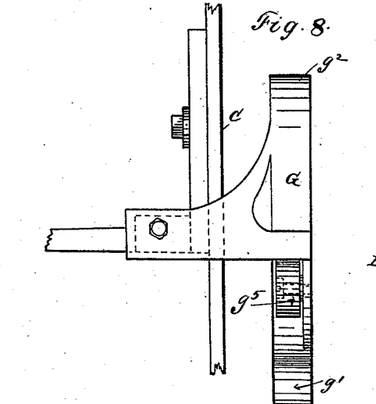

The cam G is shown in Fig. 7 by a side elevation, showing the same side as is seen in Fig. 1. Fig. 8 is a back view. In Figs. 11, 12, 13, 14, and 15 the same view is shown as in Fig. 7, with the elevator added, in dotted lines. These figures show the movements of the elevator effected by the cam.

Figures 12, 14, 15:
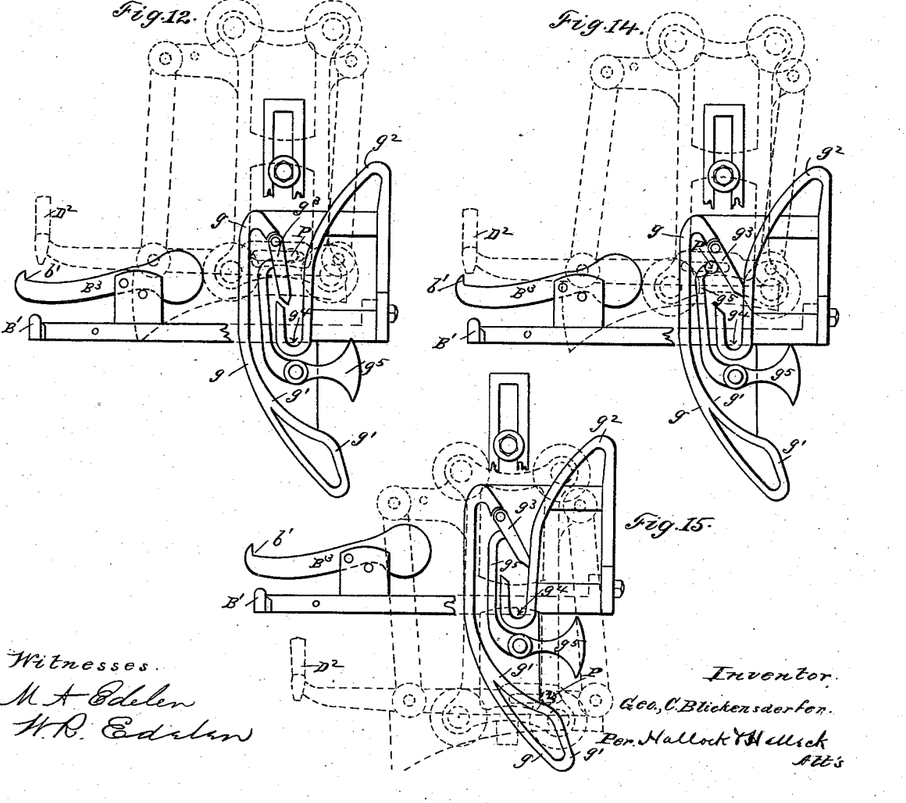
Figure 13:
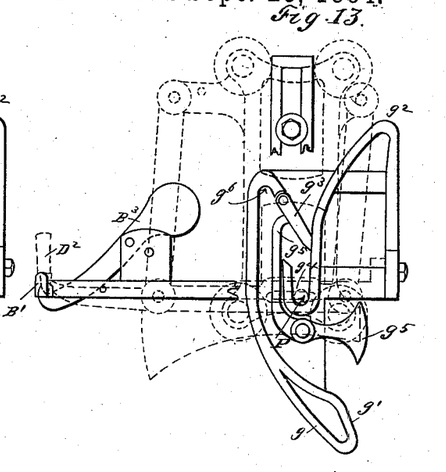

It should here be stated that $B^3$ is a gate or stop which serves to stop an incoming car on the track B' when the elevator-bar $D^2$ is not in position to receive a car from the track B'. The gate $B^3$ stops and retains the car until the elevator comes into the position just above described, and when this occurs the notch $b^2$ on the bar $D^2$ engages in the notch $b'$ on the gate $B^3$ and tips the gate down, so as to allow the passage of a car. Fig. 13 shows this position of parts. The engagement of the notches $b'$ $b^2$ serves to hold the end of the bar $D^2$ against lateral movement as a car runs onto it from the track B'. After a car is received on the bar $D^2$ the elevator has to be let down to bring the car down to the counter. In doing this the movement must be such as to release the bar $D^2$ from the gate $B^3$, and this is effected by an upward and outward and then a downward movement, so that the bar $D^2$ moves up into the position shown in Fig. 14, then off into the position shown in Fig. 11, then down under the track B' into the position shown in Fig. 15. When the elevator is drawn up to put a car on the track A, it has to be moved so that the bar $D^2$ will swing out around the end of the track B' and the end of the gate $B^3$. All the aforesaid movements are effected by cam the G acting upon the pin P. When the elevator is going up to put a car on the track A, the pin P comes in contact with the guide-face $g$, and this moves the bar $D^2$ out, so it will pass up freely beyond the end of the gate. This is clearly shown occurring in Fig. 11. When the elevator comes down, after putting the car on the track, the pin P comes in contact with the guide-face $g^2$, runs along it, and passes the point of the movable or pivoted tongue $g^3$ and comes to a stop in the hook $g^4$. When in this position, as above stated, the bar $D^2$ is in position to receive a car from the track B'. The tongue $g^3$ is kept in the position shown by the weighted lever $g^5$, and as soon as the pin P passes it it moves back into place, as shown. When the elevator is to be let down, so as to bring the car onto the counter, it is first raised up, so that the pin P hits upon the under side of the tongue $g^3$, and as it is pulled farther up the pin moves along the under side of the tongue and displaces the lever $g^5$ and passes out beyond it into the angle $g^6$. This movement is shown as occurring in Fig. 14. The elevator is then allowed to descend, and in doing so the pin P runs along the guide-face $g'$, as is shown in Fig. 15.

H is the car or basket in which the articles to be carried are placed. The running-gear of the car is attached to the bail of the basket. It consists of the wheels H' H', which traverse the main tracks A and B, and the wheels $H^2$ $H^2$, which run only on the switch-track B'. The construction of the running-gear of the basket is shown in detail in Figs. 17 and 18. The main wheels H' H' are on a part, $H^4$, which is movable vertically on a main stem of the frame $H^5$. A spring, $h^4$, is provided to move the part $H^4$ up, and a trigger, $h'$, is provided to engage with a catch-pin, $h$, and hold the part $H^4$ down. The trigger $h'$ is provided with a spring, $h^2$, by means of which it will engage with the pin $h$ when brought in contact therewith. On the lower part of the part $H^4$ there is a claw, $h^3$, whose office will be explained farther on. The wheels $H^2$ $H^2$ are journaled on fixed studs extending up from the bail of the basket. Guide-rollers $H^3$ $H^3$ are provided which operate upon the guides $B^2$ $B^2$ at the points of the switches. The car, as it will stand upon the arm $D^2$ of the elevator, after being received upon it, will have the parts of its running-gear in the position shown in Figs. 17 and 18. When the elevator is pulled up to the top, the part $H^4$ will come in contact with the block $a^2$ on the arm A' at the point $a^3$, between the wheels H' H'. This will push the part $H^4$ down on the part $H^5$, depressing the spring $h^4$, and allow the trigger $h'$ to engage the pin $h$. The parts will then be in the position shown in Fig. 1, and will so remain until the car has gone to the central station on the track A and been put onto the track B and returned to the point of the switch B', where the arm $h^2$ will come in contact with the upper end of the trigger $h'$, and move it so it will be disengaged from the pin $h$. When this occurs, the spring $h^4$ will throw the part $H^4$ and wheels $H'$ $H'$ up, and the car will drop, so that the wheels $H^2$ $H^2$ will set on the switch-track $B'$, and on these wheels the car will run onto the bar $D^2$ of the elevator. When the part $H^4$ is thrown up, the claw $h^3$ will embrace the lower side of the switch-track loosely and prevent any possible derailing of the car. When the car runs onto the bar $D^2$, the claw $h^3$ will strike against the lug $d^6$ on the under side of the bar, and thus serve to stop the car. It should be understood in this connection that when the car is once on the bar $D^2$ it does not have to be removed therefrom to empty and refill it. It is let down by the elevator to the counter, and can there be emptied and refilled, and then be raised up to the track A, where the trigger is reset by the action of the block $a^2$ on the part $H^4$, as above explained.

By the side of the track A opposite the station I put a guard, $a$, which insures a proper placement of the wheels $H'$ $H'$ on the track.

The receiving and dispatching of the cars at a station requires very little care or attention from the operator—in fact, it is almost impossible to displace or derail the car, even with the most careless manipulation.

Figures 19, 20, 21, 22, 23, 24:
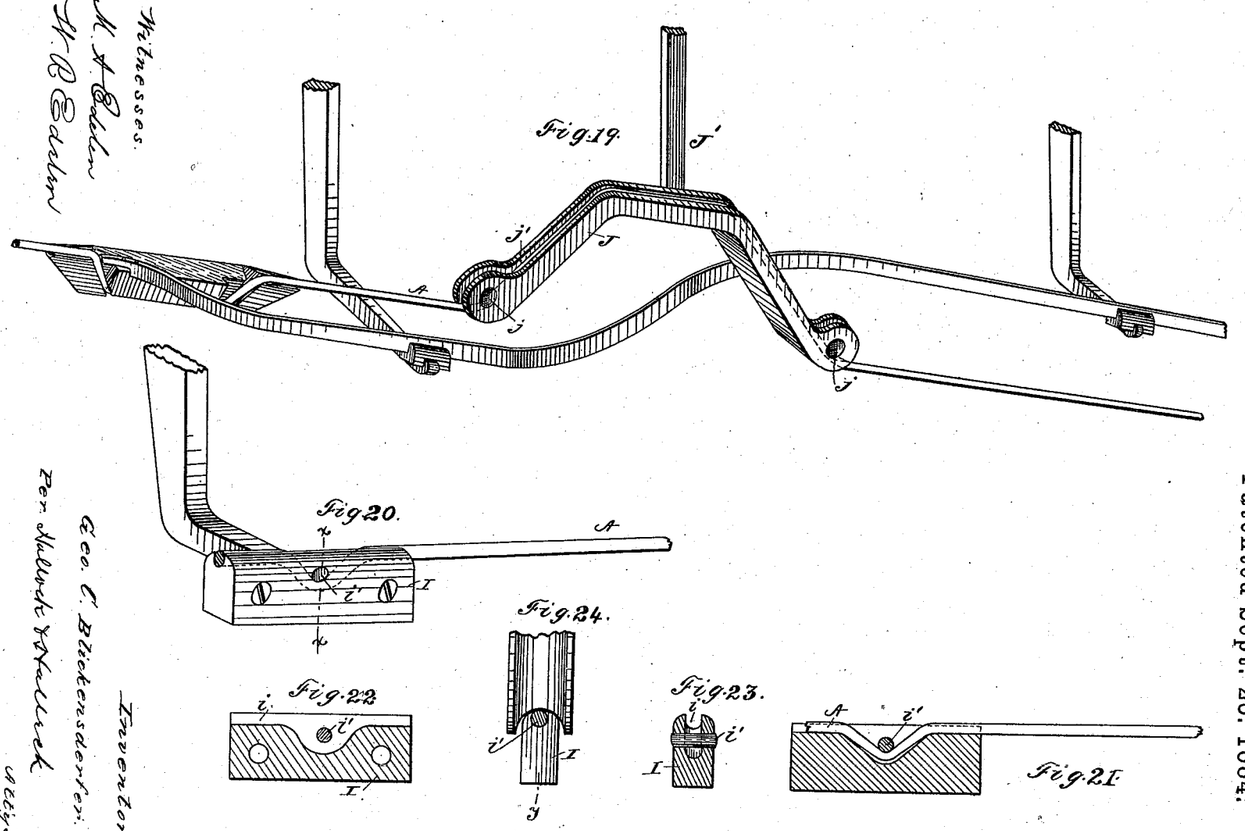

Fig. 19 is a perspective view of the means I provide for running a car under its own track. This is often desirable, especially where the tracks are made of taut wire, for the lines of wire will be erected, usually, in straight lines, and it will often be required to run the car off on another track into the central station, and where the stem of the car-frame hangs down on the side of the main line, opposite the point where the central station is located, the car must be got across the main wire. To accomplish this I put in an arch-iron, J, which is suspended by a hanger, J'. The wire passes over the arch in a groove, $j'$, and is held at the foot of the arch on each side by pins $j$.

Figs. 20, 21, 22, 23, and 24 illustrate an improved track-hanger. Heretofore the hangers have been connected with the track by vise-like clamps. Where the wire forming the track is small a vise-like clamp is not reliable, as it is difficult to make it hold the wire without embracing it entirely, and thus forming an impediment upon the track. The improved clamp here shown consists of a block, I, with a groove, $i$, in its upper face, which is rounded, so as to not obstruct the car-wheels. The groove $i$ in the middle of the block is depressed, and the wire can be deflected into this depression and secured by a pin, $i'$, which passes over it.

Fig. 20 is a perspective view. Figs. 21 and 22 are longitudinal sections on the line $y$ in Figs. 20 and 24. Fig. 23 is a transverse section on the line $x$ $x$ in Fig. 1, and Fig. 24 is an end view showing a car-wheel tread.

What I claim as new is—

1. In a conveyer apparatus, the combination, substantially as set forth, of two main tracks, A and B, a switch-track, B', communicating with the track B, an elevator track or way standing vertically by the side of said tracks, an elevator having a laterally-movable frame carrying a section of track on which cars are received from the track B', and, finally, a cam opposite the track A, which will move the said movable frame laterally as the elevator moves vertically, substantially as and for the purposes described.

2. In a conveyer apparatus, the combination, substantially as set forth, of two main tracks, A and B, a switch-track, B', communicating with the track B, an elevator track or way standing vertically by the side of said tracks, an elevator having a laterally-movable frame carrying a section of track on which cars are received from the track B', and, finally, two cams—one placed opposite the track A and the other opposite the track B'—which move the said movable frame laterally as the elevator moves vertically, substantially as and for the purposes set forth.

3. In a conveyer apparatus, the combination, substantially as set forth, of two main tracks, A and B, a switch-track, B', communicating with said track B, an elevator track or way having thereon an elevator which carries on a laterally-movable frame a section of track, the gate $B^3$ at the end of the track B', and, finally, the cam G, for moving the said movable frame laterally, substantially as and for the purposes set forth.

4. In a conveyer apparatus, the track A, the vertical elevator-way C, the elevator D, having a laterally-movable frame carrying the bar $D^2$, the cam F, and the block $a^2$, in combination with a car having wheels $H'$ $H'$ on the movable part $H^4$, and the trigger-catch $h$ $h'$, substantially as set forth.

5. In a conveyer apparatus, the combination, with the track A, car H, and elevator D, having a laterally-movable frame which supports said car, and the pin P, of the cam F, having the guides $f$, $f'$, $f^2$, $f^3$, and $f^4$, substantially as and for the purposes mentioned.

6. In a conveyer apparatus, the combination, with the track B', gate $B^3$, and the elevator D, having a laterally-movable frame which supports the car-receiving bar $D^2$, of the cam G, having the guides $g$ $g'$ $g^2$, gate $g^3$, hook $g^4$, and weighted lever $g^5$, substantially as described.

7. In a conveyer apparatus, the combination, with the switch-track B', of the bar $D^2$, swinging frame D', and elevator-frame D, substantially as described.

8. In a conveyer apparatus, the combination, with the switch-track B', of the gate $B^3$, with hook $b'$, the car-receiving bar $D^2$, with notch $b^2$, mounted on the swinging frame D', the elevator D, the pin P, and the cam G, substantially as described.

9. In a conveyer apparatus, the combination, with the car H, having tipping main wheels $H'$ and switch-wheels $H^2$, of the elevator-bar $D^2$, having depression $d^2$ and stop $d^3$, substantially as described.

10. In a conveyer apparatus, the combination, with the main tracks A and B, switch-track B', and car H, of an elevator device consisting of a vertical way or track, an elevator-car sliding on said way and supporting a car-receiving bar or track-section on a laterally-movable frame, and cams for moving said movable frame laterally as the elevator-car moves vertically, said parts forming said elevator device being arranged to operate in a manner substantially as described, whereby the elevator-car can be placed so as to receive the car H on its wheels $H^2$ $H^2$ on the car-receiving bar from the switch-track B', lower it down to the counter, raise it up to move it over and place it upon the track A on its wheels H' H', while resting on its wheels $H^2$ $H^2$ on the said car-receiving bar.

11. In a conveyer-apparatus car, the combination, with the wheels $H^2$, stem $H^5$, catch-pin $h$, and spring $h^4$, of the wheels H', sliding part $H^4$, catch-trigger $h'$, and spring $h^2$, substantially as described.

12. In a conveyer-apparatus car, the combination, with the wheels $H^2$ and the sliding part $H^4$, bearing the wheels H', of the claw $h^3$, substantially as described.

13. In a conveyer apparatus, the combination, with a taut-wire track, of the arch-iron J, substantially as and for the purposes mentioned.

14. In a conveyer apparatus, the combination, with a taut-wire track, of a hanger-clamp consisting of the block I, with rounded top, and groove $i$, and the pin $i'$, substantially as set forth.

In testimony whereof I affix my signature in presence of two witnesses.

GEO. C. BLICKENSDERFER.

Witnesses:
JNO. K. HALLOCK,
ROBT. H. PORTER.